United States Patent [19]
Tsukada

[11] Patent Number: 5,088,839
[45] Date of Patent: Feb. 18, 1992

[54] OVERRUN PREVENTING DEVICE OF A LINEAR GUIDE APPARATUS

[75] Inventor: Toru Tsukada, Maebashi, Japan

[73] Assignee: Nippon Seiko Kabushiki Kaisha, Tokyo, Japan

[21] Appl. No.: 702,786

[22] Filed: May 17, 1991

[30] Foreign Application Priority Data

May 18, 1990 [JP] Japan ................. 2-52035[U]

[51] Int. Cl.$^5$ ................................................ F16C 29/06
[52] U.S. Cl. .......................................... 384/45; 384/15
[58] Field of Search ..................... 384/43–45, 384/21, 15, 54, 55

[56] References Cited

U.S. PATENT DOCUMENTS

| | | | |
|---|---|---|---|
| 4,701,058 | 10/1987 | Mottate | 384/45 |
| 4,828,402 | 5/1989 | Osawa | 384/15 |
| 4,886,375 | 12/1989 | Tsukada | 384/15 |
| 4,986,508 | 1/1991 | Osawa et al. | 384/15 X |

Primary Examiner—Thomas R. Hannon
Attorney, Agent, or Firm—Basile and Hanlon

[57] ABSTRACT

An overrun preventing device to prevent a slider from falling off of a guide rail is fixed to one end of the guide rail of a linear guide apparatus. The overrun preventing device includes a main body made of a metal plate having an inverted U-shaped cross section, and a slide plate. The main body has lift preventing plate portions formed by bending lower edges of both side walls of the main body inwardly at right angles so that the lift preventing plate portions are engaged with rolling member rolling grooves formed in both sides of the guide rail to prevent upward movement of the main body. The slide plate has a rectangular shape. One end of the slide plate is inserted between the main body and the upper surface of the guide rail so that the slide plate is expandable with respect to the main body depending on a fixing position of the slide plate on the guide rail. In order to adjust the fixing position, a pair of axial, parallel slots are formed in an upper plate portion of the main body and positioning screws are screwed into the end of the slide plate after passing through the slots. An impulse absorbing member made of rubber is attached to the other end of the slide plate to absorb an impulse imparted by a slider on the overrun preventing device.

7 Claims, 6 Drawing Sheets

OVERRUN PREVENTING DEVICE OF A LINEAR GUIDE APPARATUS

BACKGROUND OF THE INVENTION

1. Field of the Invention

The present invention relates to a linear guide apparatus and, in particular, to an overrun preventing device of a linear guide apparatus for preventing a slider from falling off of a guide rail.

2. Description of the Relevant Art

With reference to FIG. 16, a prior art linear guide apparatus includes a guide rail 1 which has rolling member rolling grooves 3 extending in an axial direction and formed in both side surfaces 1c. A slider 2 straddling the long guide rail 1 has rolling member rolling grooves (not shown) in inner surfaces of both side walls so that the rolling member rolling grooves of the slider 2 respectively oppose the rolling member rolling grooves of the guide rail 1. A multiplicity of rolling members (balls or rollers) are rollably inserted in the mutually opposing rolling member rolling grooves. When the slider 2 moves on the guide rail 1 in an axial direction, the rolling members circulate through circulating routes provided within the slider 2 while rolling and moving. However, in a condition in which the slider 2 has been removed from the guide rail 1, the rolling members are held in the rolling member rolling grooves by rolling member retainers which are mounted in the slider 2 to prevent the falling off of the rolling members. On the other hand, when the slider 2 is assembled to the guide rail 1, the rolling member retainers are accommodated in retainer relief grooves 3a formed in the bottoms of the rolling member rolling grooves 3 so that the rolling member retainers are not in contact with the guide rail 1 and do not disturb the circulation of the rolling members.

The guide rail 1 is secured by bolts to, for example, a machine tool, a robot, a measurement equipment, a precision positioning table, and the like. On the other hand, for example, in the case of the machine tool, a driven member, such as a cutter, is fixed to the slider 2 by screws and is moved linearly along the guide rail 1 together with the slider 2.

A prior art overrun preventing device of the linear guide apparatus is solely intended to prevent the slider 2 from being separated or removed from the guide rail 1 during transportation of the linear guide apparatus or before the linear guide apparatus is mounted on a machine base at an installation site. Accordingly, for example, as shown in FIG. 16, a rubber plug 6 is inserted into a fixing bolt bore 7 of the guide rail 1.

However, in such a prior art overrun preventing device of the linear guide apparatus, since the rubber plug 6 is removed from the fixing bolt bore 7 of the guide rail 1 at the time of assembling the linear guide apparatus at the installation site, the slider 2 frequently falls off of an end of the guide rail 1 due to overrun of the slider 2 during an accuracy check in operating the linear guide apparatus. Thus, the linear guide apparatus becomes inoperative.

Furthermore, in general, the linear guide apparatus is used in combination with a feed mechanism employing a ball screw and, in this case, since an overrun preventing stopper is provided on the ball screw, an overrun preventing device of the linear guide apparatus is unnecessary. However, when the linear guide apparatus is used in combination with another feed device, for example, a linear feed device, such as a air pressure cylinder, a hydraulic cylinder, a rack and a pinion, or the like, the overrun preventing stopper is never used. Accordingly, the slider 2 sometimes overruns and falls off of the end of the guide rail 1 and is damaged.

SUMMARY OF THE INVENTION

The present invention was made in view of the problems in the prior art and it is an object of the invention to provide an overrun preventing device of a linear guide apparatus which can be mounted to a guide rail in a simple manner in accordance with the type of use of the linear guide apparatus and which can reliably prevent overrun of the slider.

In an overrun preventing device of a linear guide apparatus in the present invention, the linear guide apparatus includes a guide rail having rolling member rolling grooves formed in both sides and a slider movably and loosely fitted about the guide rail and having rolling member rolling grooves respectively opposing the rolling member rolling grooves of the guide rail so that the slider and the guide rail are movable relative to each other in an axial direction through the rolling of a multiplicity of rolling members fitted into the rolling member rolling grooves. The overrun preventing device includes a main body straddling an upper surface of the guide rail and having an inverted U-shaped cross section. The main body has plate portions engaged with the rolling member rolling grooves of the guide rail for preventing lifting of the main body and has long axially extending slots for adjusting the axial position of the main body. A slide plate having one end inserted into a gap between the main body and the upper surface of the guide rail is expandably coupled to the main body by positioning bolts inserted into the position adjusting slots. The slide plate further has an impulse absorbing member at the other end, a fitting aperture at an intermediate position of the slide plate for inserting a guide rail fixing bolt therethrough, and a pressing means for pressing the slide plate against the guide rail.

The pressing means may be a bolt which is screwed into the upper surface of the main body to press the slide plate against the upper surface of the guide rail. Alternately, the pressing means may be a pressing portion formed by cutting out an upper surface of the main body into a U-shape, with the cutout portion bent so as to elastically press the slide plate against the upper surface of the guide rail.

The lifting preventing plate portions of the main body may have a curved shape at their end portions.

The main body may have axially extending reinforcing ridges formed on the upper surface at positions aligned with the position adjusting slots of the main body.

The main body may be formed with recessed portions extending from ends of the position adjusting slots to an end of the main body.

The slide plate ma have axially extending reinforcing recesses formed in the upper surface.

In mounting the overrun preventing device to the linear guide apparatus, the overrun preventing device is inserted into the guide rail from an end of the guide rail so that the lifting preventing plate portions are respectively engaged with the rolling member rolling grooves of the guide rail.

In this case, when the linear guide apparatus has not yet been assembled to a machine base, no large impulse is applied to the overrun preventing device. Accordingly, in this case, the overrun preventing device can be fixed in position by merely clamping the pressing bolt of the main body so as to press the slider plate against the upper surface of the guide rail or by providing an elastic pressing portion to press the slide plate against the upper surface of the guide rail, thereby clamping or sandwiching the guide rail between the lifting preventing plate portions and the slide plate.

In the case where the linear guide apparatus has already been assembled to the machine base, a large impulse may be applied to the overrun preventing device when the slider collides with the overrun preventing device. In such a case, not only is the overrun preventing device mounted to the end portion of the guide rail, but the guide rail fixing bolt is also engaged with the bolt fitting bore of the slide plate so that the slide plate is supported by the guide rail. At the same time, slide plate positioning bolts which are inserted through the position adjusting slots of the main body are clamped to thereby securely couple the main body to the slide plate. In this case, even when the distance between an end of the guide rail and the guide rail fixing bolt inserting aperture is different depending on the type of the linear guide apparatus, since it can be freely adjusted by the position adjusting slots, the same overrun preventing device can be utilized in various applications. When the overrun preventing device fixed securely to the guide rail is struck by the slider having a member of a large weight, such as a cutter of the like, attached thereto, the large impulse is absorbed by the impulse absorbing member attached to the end of the slider plate and the slider is stopped.

Furthermore, in the case wherein the slider having a member with a large load attached thereto is moved at high speeds, the slide plate is supported by engaging the guide rail fixing bolt with the bolt fitting bore of the slider and, at the same time, the main body is securely coupled to the slide plate by clamping the slide plate positioning bolts inserted through the position adjusting slots of the main body. In addition, the rising portion formed at an end of the main body is fixed to the machine base by bolts. By this construction, the fixing of the overrun preventing device becomes more secure. The rising portion at the end of the main body is utilized not only for fixing the main body to the machine base, but also for attaching a dust preventing bellows of the linear guide apparatus.

Furthermore, in the case where the slider moves at high speeds with a large lead and, in particular, when the reinforcing ridges or the reinforcing recesses are formed in the slide plate in the axial direction, the strength of the slide plate is increased to a great extent and the overrun preventing function is further improved.

When the end portions of the lifting preventing plate portions are curved so that the curved portions are fitted into the rolling member rolling grooves of the guide rail, the curved surfaces of the curved portions can be brought into close contact with the curved surfaces of the rolling member rolling grooves which are formed in the side surfaces of the guide rail. As a result, the overrun preventing device can be mounted securely without utilizing retainer relief grooves formed in the bottoms of the rolling member rolling grooves.

DESCRIPTION OF THE PREFERRED EMBODIMENTS

FIGS. 1 to 5 show a first embodiment of the present invention.

Figure 1:
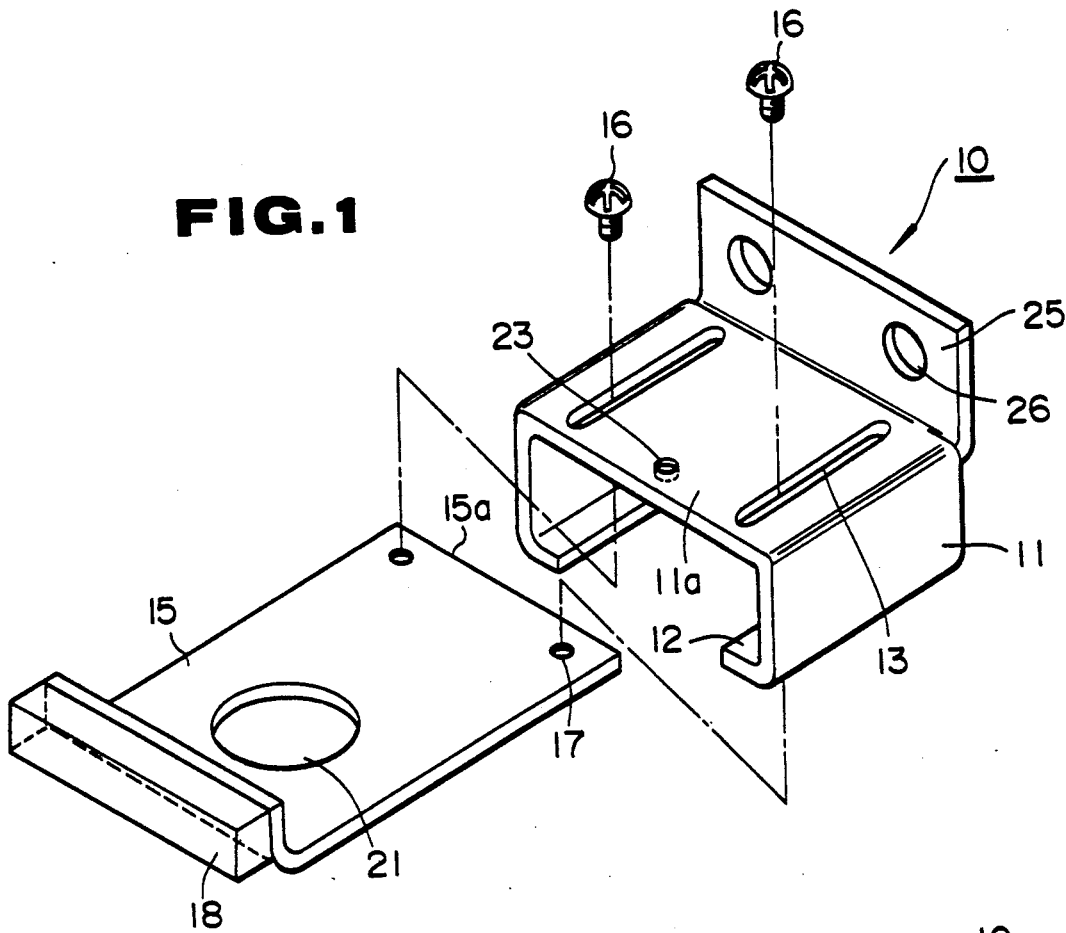
FIG. 1 is a disassembled perspective view of an overrun preventing device of a first embodiment of the invention.
Figure 2:
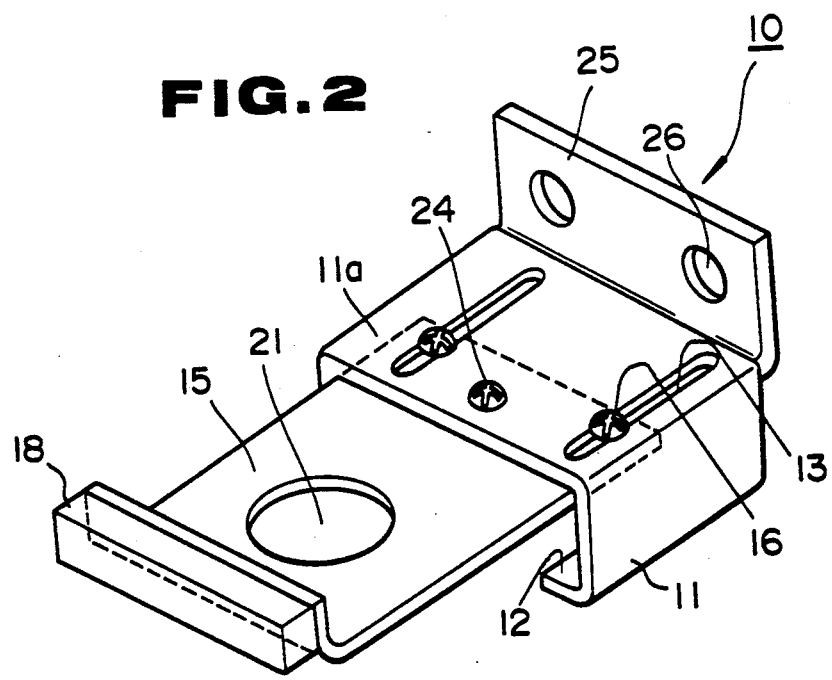
FIG. 2 is an assembled perspective view of the overrun preventing device shown in FIG. 1.
Figure 3:
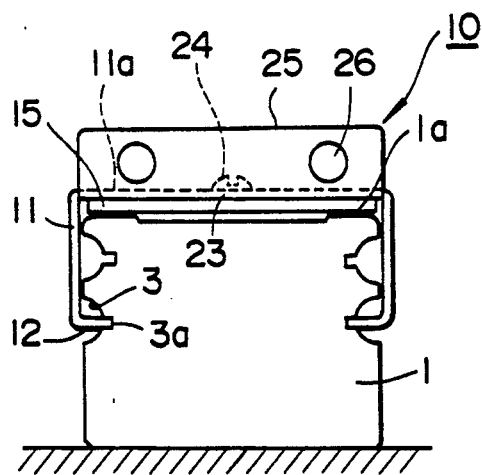
FIG. 3 is a rear elevational view of a linear guide apparatus with the overrun preventing device shown in FIG. 1 attached thereto.

First, with reference to FIGS. 1 and 2, the structure of an overrun preventing device 10 will now be described. The overrun preventing device 10 is made of a metal plate and has a main body 11 with a substantially inverted U-shaped cross section. The main body 11 straddles an upper surface 1a of a guide rail 1 (FIG. 3). Lower edge portions of both side plate portions of the U-shaped main body 11 are further bent inwardly at right angles, and lift preventing plate portions 12 are formed which extend lengthwise in an axial direction and which sandwich both sides of the guide rail 1. An extreme end of each lift preventing plate portion 12 is fittable into a retainer relief groove 3a formed in a groove bottom of a rolling member rolling groove 3 of the guide rail 1 (FIG. 3). The main body 11 has a pair of position adjusting elongated slots 13 extending in the axial direction and in parallel to each other. A positioning bolt 16 of a slide plate 15 is loosely insertable through each of the position adjusting slots 13.

Figure 5:
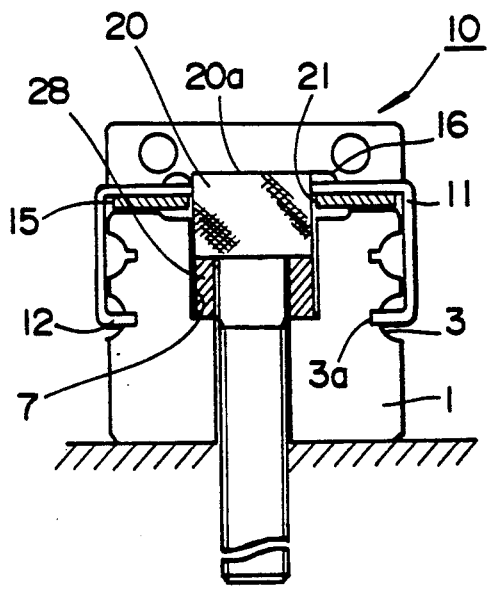
FIG. 5 is a cross sectional view generally taken along line 5—5 in FIG. 4.

The slide plate 15 has a width somewhat narrower than the inside width of an upper plate portion of the inverted U-shaped main body 11. The slide plate 15 is a rectangular-shaped plate member extending in the axial direction. An end 15a of the slide plate 15 is a portion which is inserted into a gap between the main body 11 and the upper surface 1a of the guide rail 1. Screw apertures 17 are formed in end portions of the slide plate 15 into which the positioning bolts 16 are screwed after passing through the position adjusting slots 13. Further, the other end of the slide plate 15 opposite to the inserting end 15a is bent upwardly and an impulse absorbing member 18 made of rubber or synthetic resin is attached to an outer surface of the upwardly bent portion by bonding, welding, or fixed by a bolt, or the like. A fitting aperture 21 for a guide rail fixing bolt 20 is formed in an intermediate portion of the slide plate 15 between the inserting end 15a and the other end. The fitting aperture 21 has an inner diameter somewhat larger than the outer diameter of a head 20a of the guide rail fixing bolt 20 (FIG. 5).

A screw aperture 23 is formed in an upper surface 11a of the main body 11 and a slide plate pressing bolt 24 is screwed therethrough. The main body 11 is formed with a rising portion 25 at an axial end opposite to the slide plate 15. The upright or rising portion 25 is bent upwardly at right angles with respect of to the upper surface 11a. Two bolt inserting apertures 26 are formed in the rising portion 25. The rising portion 25 is not necessarily formed in this manner and, depending on a manner of using the overrun preventing device 10, the rising portion 25 may not be provided at all.

Figure 4:
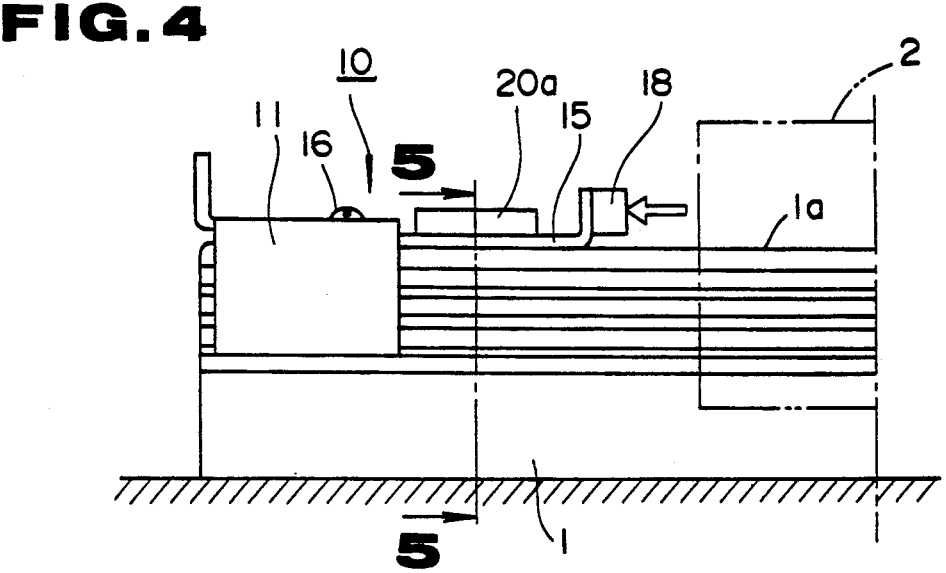
FIG. 4 is a side elevational view of the linear guide apparatus with the overrun preventing device shown in FIG. 1 attached thereto.

Next, referring to FIGS. 3 to 5, the operation of the overrun preventing device 10 will be described.

The overrun preventing device 10 is mounted to the guide rail 1 by inserting the overrun preventing device 10 from an end of the guide rail 1 so that the lifting preventing plate portions 12 are respectively engaged with the rolling member rolling grooves 3 of the guide rail 1.

The fixing method of the overrun preventing device 10 is somewhat different depending on whether the linear guide apparatus has not yet been assembled to a machine base, for example, during transportation of the linear guide apparatus, or whether the linear guide apparatus has already been assembled to the machine base. That is, when the linear guide apparatus has not yet been assembled to the machine base, no large impulse is applied to the overrun preventing device 10. In this case, as shown in FIG. 3, the main body 11 of the overrun preventing device 10 is inserted into an end of the guide rail 1 so that the slide plate 15 is positioned at a front side of the guide rail 1 and the extreme ends of the lift preventing plate portions 12 are made to engage the retainer relief grooves 3a of the rolling member rolling grooves 3 of the guide rail 1. The slide plate 15 is inserted into a gap between a lower surface of the main body 11 and the upper surface 1a of the guide rail 1. Thereafter, it is only required to tighten the slide plate pressing bolt 24 which is screwed into the screw aperture 23 in the upper surface 11a of the main body 11. As a result, the slide plate 15 is strongly pressed against the upper surface 1a of the guide rail 1 and the guide rail 1 is sandwiched and secured by the slide plate 15 and the lift preventing plate portions 12 of the main body 11. Thus, the overrun preventing device 10 is fixed to the guide rail 1 and it is possible to prevent the slider 2 from falling off of the guide rail 1.

On the other hand, when the linear guide apparatus has been assembled to the machine base, there is a possibility that a large impulse is applied to the overrun preventing device 10 when the slider 2 collides with the overrun preventing device 10. In this case, as shown in FIGS. 4 and 5, the overrun preventing device 10 is inserted into an end portion of the guide rail 1 and, at the same time, the head 20a of the guide rail fixing bolt 20 is engaged with the fitting aperture 21 of the slide plate 15 to fix the slide plate 15 in place. In addition, the slide plate positioning bolts 16 which are inserted through the position adjusting slots 13 (FIG. 1) are tightened so as to couple the main body 11 to the slide plate 15. In this case, as shown in FIG. 5, a slot 28 is formed in a spot facing portion of the fixing bolt aperture or bore 7 of the guide rail 1 and the height of the head 20a of the guide rail fixing bolt 20 is adjusted so that an upper surface of the head 20a protrudes above the upper surface of the slide plate 15 by a small amount.

When an interval between the end of the guide rail 1 and the guide rail fixing bolt bore 7 varies depending on the type of the linear guide apparatus, the slide plate 15 is made to advance or retreat with respect to the main body 11 by utilizing the position adjusting slots 13 of the main body 11 of the overrun preventing device 10. As a result, the same type of the overrun preventing device 10 can be applied to various types of linear guide apparatuses.

When a slider 2 attached with a member having a large weight, such as a cutter or the like, collides with the overrun preventing device 10 which is firmly fixed to the end portion of the guide rail 1, the large impulse is absorbed by the impulse absorbing member 18 attached to the end of the slide plate 15 and the slider 2 is stopped preventing the overrun of the slider 2.

Figure 6:
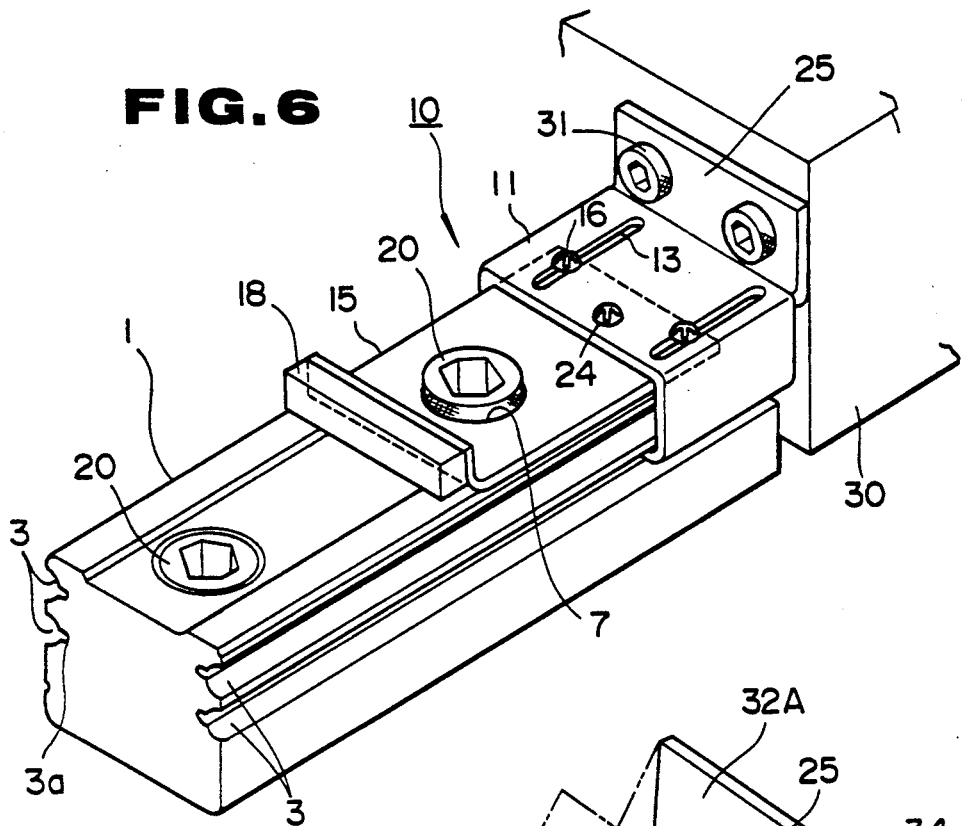
FIGS. 6 and 7 depict other attaching structures of the overrun preventing device shown in FIG. 1.

Furthermore, in the case where the linear guide apparatus is assembled to a machine and the slider 2 attached with a member of a large load is moved at high speeds, the impulse generated by the collision of the slider 2 with the overrun preventing device 10 will be very large. FIG. 6 shows a way of fixing the overrun preventing device 10 in such a case. Specifically, the slide plate 15 is fixed by engaging the head 20 of the guide rail fixing fastener or bolt with the fitting aperture 21 in the slider plate 15 and, at the same time, the main body 11 and the slide plate 15 are coupled to each other by tightening the slide plate positioning bolts 16 which pass through the position adjusting slots 13 of the main body 11. Furthermore, the rising portion 25 at one end of the main body 11 is fixed to a machine base 30 by bolts 31. Thus, the fixing of the overrun preventing device 10 is made more secure.

Figure 7:
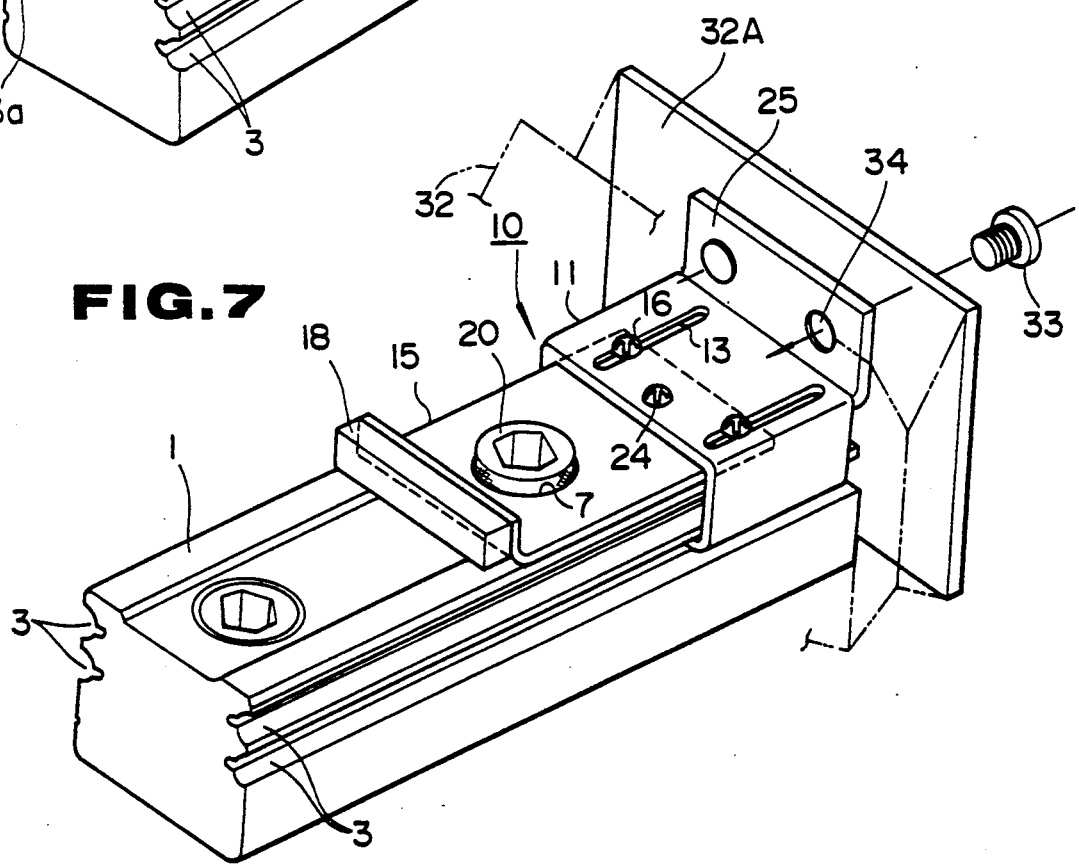

FIG. 7 shows another use of the rising portion 25 of the main body 11 in the overrun preventing device 10. In this case, the overrun preventing device 10 is used for preventing the overrun and, also, for attaching a dust preventing bellows to the linear guide apparatus. Specifically, a fixing plate 32A at an end of a bellows 32 of a dust cover is applied to the rising portion 25 and fixing screws 33 are screwed into tap apertures 34 formed in the rising portion 25. In this manner, one end of the bellows 32 is fixed to the guide rail 1 through the overrun preventing device 10. The other end of the bellows 32 is held at an end surface of the slider 2. When rivets are used to mount the bellows 32, rivet apertures are formed instead of the tap apertures 34. Furthermore, when the bellows 32 is fixed to the rising portion 25 by welding, the tap apertures 34 and the rivet apertures are not necessary.

In this manner of use, there is no need to form screw apertures for fixing a dust cover at an end surface of the guide rail and the manufacturing cost and the delivery term can be reduced. Furthermore, usually the guide rail 1 is cut to a suitable length in accordance with a particular need and, even when the guide rail 1 is cut at any position, the dust cover can still be instantly attached.

Figure 8:
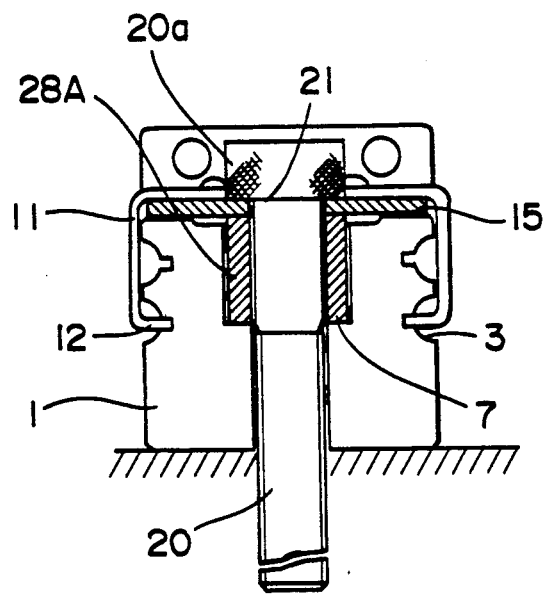
FIG. 8 is similar to FIG. 5 and shows a variation for fixing the slide plate of the overrun preventing device shown in FIG. 1.

FIG. 8 shows another example of a method of fixing the slide plate 15 by the guide rail fixing bolt 20.

In this example, a spot facing portion of the fixing bolt hole 7 of the guide rail 1 is formed with a long slot 28A and the slide plate 15 is fixed in place by being sandwiched between an upper surface of the slot 28A and a lower surface of the head 20a of the guide rail fixing bolt 20. In this case, the diameter of the bolt fitting aperture 21 formed in the slide plate 15 is made slightly larger than the diameter of a portion below the neck of the guide rail fixing bolt 20. In this example, the slide plate 15 is firmly fixed without allowing even a slight movement.

Figure 9:
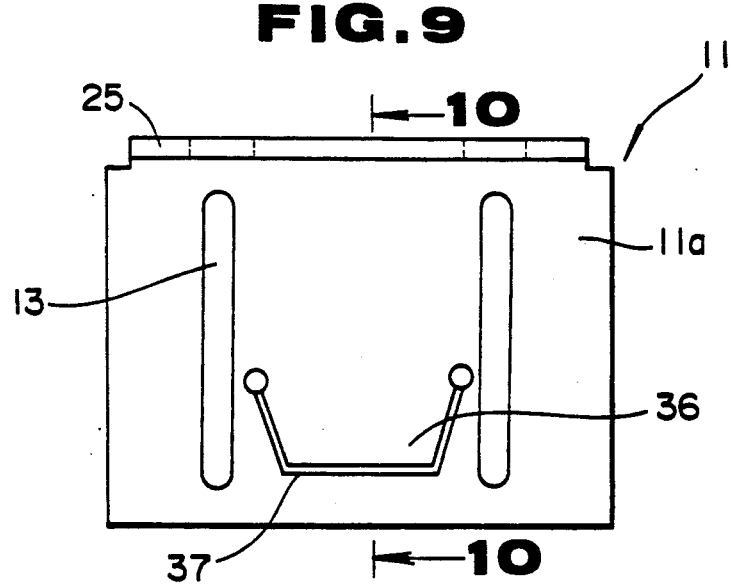
FIG. 9 is a plan view of the main body of an overrun preventing device according to a second embodiment of the invention.
Figure 10:
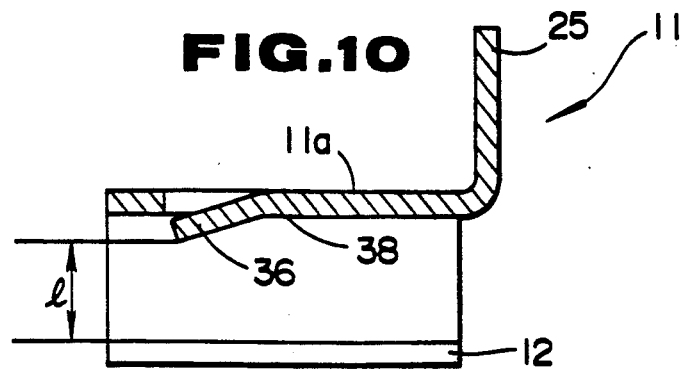
FIG. 10 is a cross sectional view generally taken along line 10—10 in FIG. 9.

FIGS. 9 and 10 show a second embodiment of an overrun preventing device 10 of the present invention 10. In this embodiment, as a means for pressing the slide plate 15 against the upper surface 1a of the guide rail 1, in place of the arrangement of the first embodiment in which the slide plate pressing bolt 24 is screwed into the screw aperture 23 of the upper surface 1a of the main body 11, a portion of the upper surface 1a of the main body is cut out in a substantially U-shape and the cutout portion is bent or curved downwardly to form an elastic pressing portion 36 to elastically press the slide plate 15 against the upper surface of the guide rail 1. In forming the elastic pressing portion 36, a cut 37 is made in the upper surface 1a of the main body 11 in a substantially U-shape. The cutout portion is slightly bent downwardly at a base portion 38 to form a tongue-shaped portion protruding in a downwardly slanted direction. In order that the extreme end of the elastic pressing portion 36 is enabled to strongly elastically press the upper surface of the guide rail 1 when the lift preventing plate portions 12 of the main body 11 are engaged with the rolling member rolling grooves 3 of the guide rail 1, an interval l between the extreme end of the elastic pressing portion 36 and the extreme end of the lift preventing plate portion 12 is adjusted. By changing the interval l, it is possible to easily adjust the degree of clamping of the overrun preventing device 10 to the guide rail 1.

Figure 11:
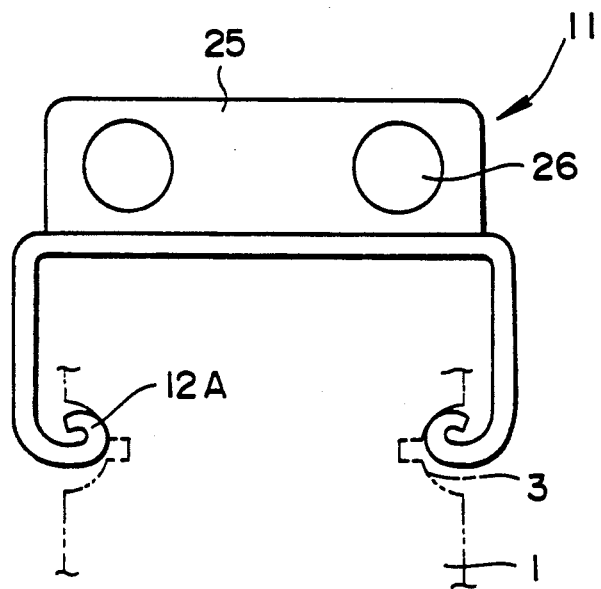
FIG. 11 is a front elevational view of a main body of a linear guide apparatus according to a third embodiment of the invention.

FIG. 11 shows a third embodiment of the present invention.

In this embodiment, lift preventing plate portions 12A of the main body 11, which are fitted into the rolling member rolling grooves 3 of the guide rail 1, are curled or wound inwardly to form a curved shape. Thus, the curve-shaped lift preventing plate portions 12A can be made to closely contact the curved surfaces of the rolling member rolling grooves 3. As a result, regardless of whether the rolling member rolling grooves 3 have the retainer relief grooves 3a or not, the main body 11 can be securely mounted on the guide rail 1.

Figure 12:
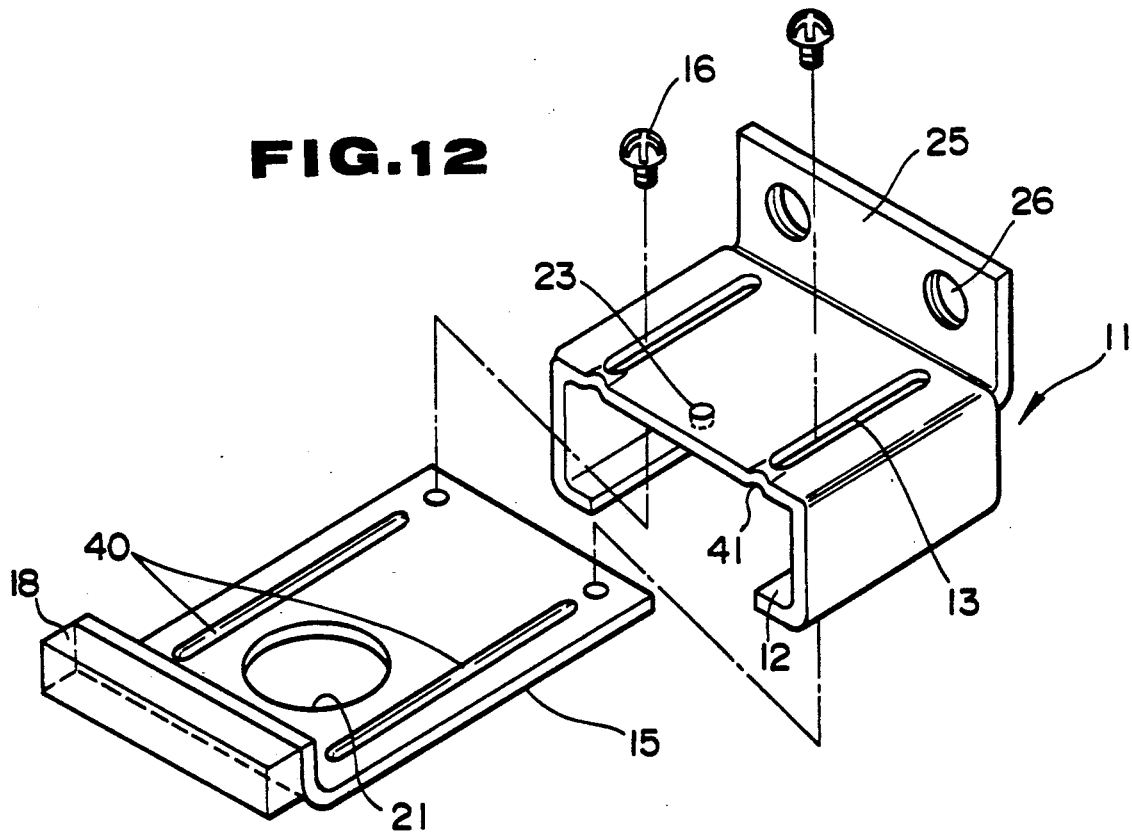
FIGS. 12 and 13 are disassembled and assembled perspective views of a fourth embodiment of the present invention.
Figure 13:
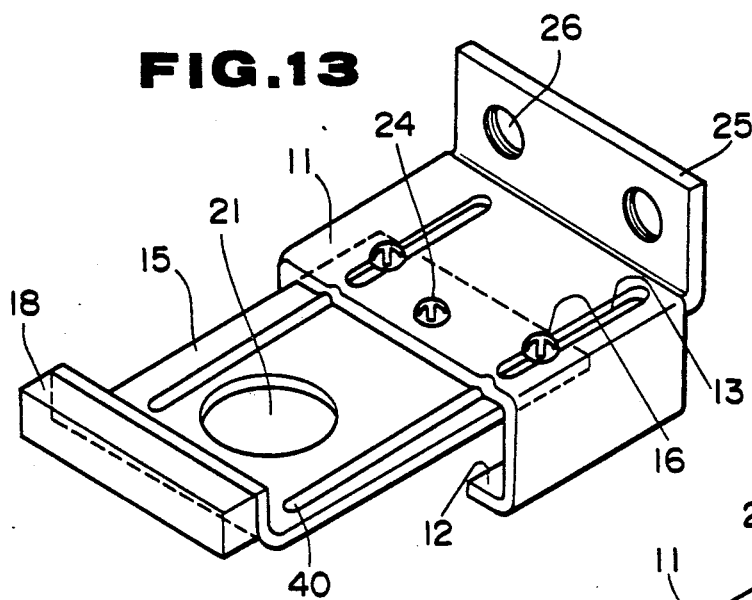

FIGS. 12 and 13 show a fourth embodiment of the present invention.

In this embodiment, a pair of reinforcing ridges 40 are formed, such as by stamping, on the upper surface of the slide plate 15 such that the reinforcing ridges 40 extend axially in alignment with the position adjusting slots 13. At the same time, a pair of recessed grooves 41 are formed in a lower surface of the main body 11, such as by stamping, and extend from the ends of the position adjusting slots 13 to an end of the main body 11 such that the reinforcing ridges 40 are fitted into the recessed grooves 41. By this structure, it is possible to effectively prevent axial deformation of the slide plate 15 due to a collision of the slider with the overrun preventing device 10.

Figure 14:
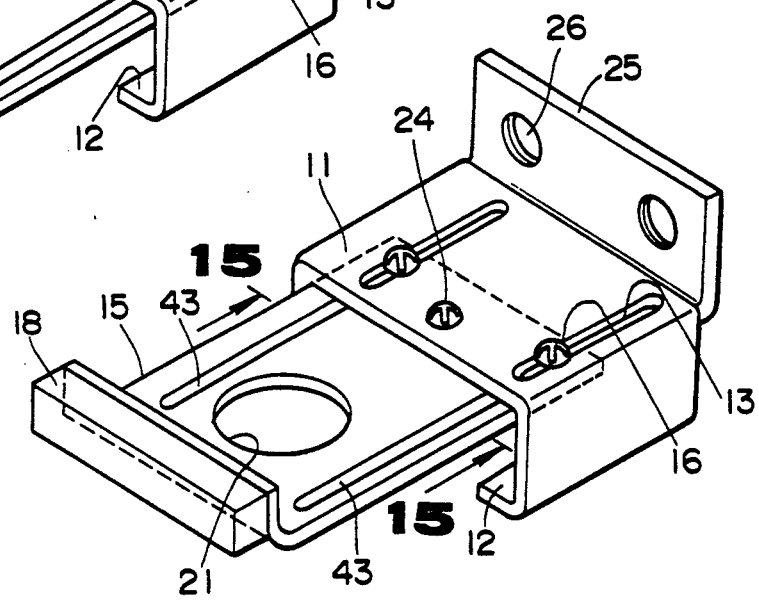
FIG. 14 is a perspective view of a fifth embodiment of the present invention.
Figure 15:
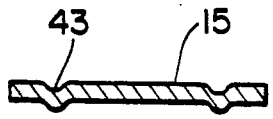
FIG. 15 is a cross sectional view generally taken along line 15—15 in FIG. 14.
Figure 16:
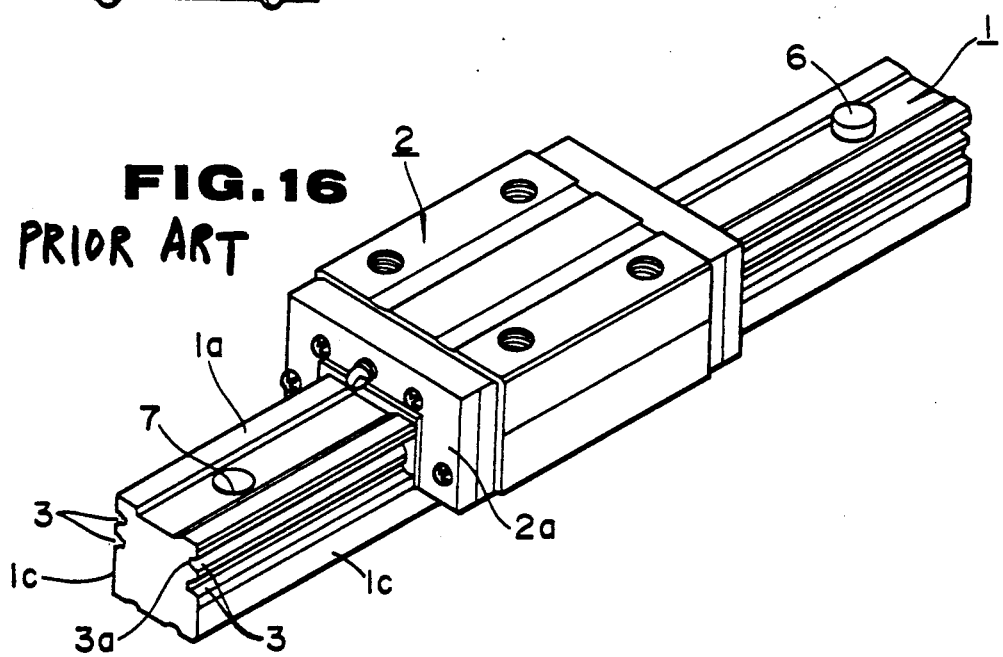
FIG. 16 is a perspective view of a linear guide apparatus with a prior art overrun preventing device attached thereto.

FIGS. 14 and 15 show a fifth embodiment of the present invention.

In this embodiment, a pair of reinforcing, axially extending, recessed grooves 43 are formed in an upper surface of the slide plate 15, such as by stamping. In this case, the positions of the reinforcing recessed grooves 43 are not necessarily aligned with the position adjusting slots 13. Furthermore, the recessed grooves 41 in the fourth embodiment are not necessary. Also in this embodiment, the axial deformation of the slide plate 15 due to a collision with the slider 2 can be effectively prevented.

Furthermore, in the inverted U-shaped main body 11, a rib may be formed at each of the bent portions of the lift preventing plate portions 12 at the rear of the main body 11 in order to increase the rigidity of these portions.

Furthermore, the extreme ends of the lift preventing plate portions 12 may be curved slightly upwardly along the longitudinal direction. By this structure, an elastic clamping interference is provided when the lift preventing plate portions 12 are fitted into the rolling member rolling grooves 3 or the retainer relief grooves 3a.

As described in the foregoing, the overrun preventing device can be easily mounted to a linear guide apparatus and it is possible to advantageously prevent the slider from falling off of the guide rail due to overrun of the slider.

What is claimed is:

1. An overrun preventing device of a linear guide apparatus wherein the linear guide apparatus includes a guide rail having rolling member rolling grooves formed in both sides and a slider movably and loosely fitted about the guide rail and having rolling member rolling grooves respectively opposing the rolling member rolling grooves of the guide rail so that the slider and the guide rail are movable relative to each other in an axial direction through rolling movement of a plurality of rolling members fitted into the opposing rolling member rolling grooves, the overrun preventing device comprising:

a main body straddling an upper surface of the guide rail and having an inverted U-shaped cross section, the main body having lift preventing plate portions respectively formed at lower edges of both side walls of the main body so as to be engaged with the rolling member rolling grooves of the guide rail to prevent lifting of the main body, the main body having a pair of position adjusting slots formed in an upper plate portion and extending axially for adjusting the axial position of the main body with respect to the guide rail;

a slide plate having one end inserted into a gap between the main body and the upper surface of the guide rail so as to be expandably coupled to the main body by positioning fasteners inserted into the position adjusting slots, the slide plate further having an impulse absorbing member at the other end and having a fitting aperture at an intermediate position between both ends of the slide plate for inserting a guide rail fixing fastener therethrough; and a pressing means for pressing the slide plate against the guide rail.

2. The overrun preventing device of a linear guide apparatus according to claim 1, wherein the pressing means includes a pressing fastener which is screwed into the upper surface of the main body to press the slide plate against the upper surface of the guide rail.

3. The overrun preventing device of a linear guide apparatus according to claim 1, wherein the pressing means includes a tongue-shaped pressing portion formed by cutting the upper surface of the main body in a U-shape, the cutout portions being bent downwardly so as to elastically press the slide plate against the upper surface of the guide rail.

4. The overrun preventing device of a linear guide apparatus according to claim 1 wherein the lift preventing plate portions have extreme ends formed in a curved shape.

5. The overrun preventing device of a linear guide apparatus according to claim 1 wherein the main body has a rising portion at one end thereof which rises upwardly and perpendicularly with respect to the upper surface of the main body, the rising portion being formed with a fastener inserting aperture.

6. The overrun preventing device of a linear guide apparatus according to claim 1 wherein the slide plate has a pair of reinforcing ridges formed on the upper surface thereof, the reinforcing ridges extending axially and being aligned with the position adjusting slots of the main body, and wherein the main body has a pair of recessed grooves formed in a lower surface extending form the ends of the position adjusting slots and an end of the main body, the reinforcing ridges being respectively fitted into the recessed grooves.

7. The overrun preventing device of a linear guide apparatus according to claim 1 wherein the slide plate has axially extending reinforcing recessed grooves formed in the upper surface thereof.

* * * * *